US012417061B2

(12) United States Patent
Hershey et al.

(10) Patent No.: US 12,417,061 B2
(45) Date of Patent: Sep. 16, 2025

(54) CORRECTING IMAGERY WITH DIFFERENTIAL APPLIED SCALARS

(71) Applicant: Microsoft Technology Licensing, LLC, Redmond, WA (US)

(72) Inventors: Kyle William Hershey, Seattle, WA (US); Scott Robert Piecuch, Seattle, WA (US); Ying Zheng, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 157 days.

(21) Appl. No.: 18/059,322

(22) Filed: Nov. 28, 2022

(65) Prior Publication Data
US 2024/0094969 A1 Mar. 21, 2024

Related U.S. Application Data

(60) Provisional application No. 63/376,536, filed on Sep. 21, 2022.

(51) Int. Cl.
*G06F 3/14* (2006.01)
(52) U.S. Cl.
CPC ... *G06F 3/1407* (2013.01); *G09G 2320/0233* (2013.01); *G09G 2320/043* (2013.01)
(58) Field of Classification Search
CPC .. G09G 3/20; G09G 3/006; G09G 2320/0233; G09G 2320/043;
(Continued)

(56) References Cited

U.S. PATENT DOCUMENTS

| 6,360,022 B1 | 3/2002 | Lubin et al. |
| 2005/0285822 A1* | 12/2005 | Reddy ................. H10K 65/00 345/76 |

(Continued)

FOREIGN PATENT DOCUMENTS

| JP | 2011053634 A | 3/2011 |
| JP | 2018120180 A | 8/2018 |
| WO | 2021162281 A1 | 8/2021 |

OTHER PUBLICATIONS

"International Search Report and Written Opinion Issued in PCT Application No. PCT/US23/027955", Mailed Date: Oct. 10, 2023, 13 Pages.

*Primary Examiner* — Shaheda A Abdin
(74) *Attorney, Agent, or Firm* — Alleman Hall & Tuttle LLP

(57) ABSTRACT

Disclosed is the differential application of scalars to compensate pixel degradation. Input image data is associated with a commanded luminance at each of a plurality of pixels. A degradation value is determined for each pixel. Based on the degradation value, an elevated drive current is determined to produce commanded luminance at the pixel. A required scalar is determined for each pixel to hold the elevated drive current from exceeding a drive current threshold. An applied scalar for each pixel is determined for each pixel to be applied to the elevated drive current. For at least some pixels, the applied scalar for a first pixel is based at least on [1] the required scalar of a second pixel and [2] a spatial relationship between the first pixel and the second pixel. Applied scalars are then used to output corrected imagery.

20 Claims, 6 Drawing Sheets

(58) Field of Classification Search
CPC ....... G09G 2354/00; G09G 2320/0693; G09G 2320/046; G06F 3/1407
See application file for complete search history.

(56) References Cited

U.S. PATENT DOCUMENTS

| | | |
|---|---|---|
| 2008/0106649 A1 | 5/2008 | Prusia et al. |
| 2011/0150356 A1* | 6/2011 | Jo ........................... G06T 5/70 |
| | | 382/269 |
| 2012/0133835 A1 | 5/2012 | Van et al. |
| 2013/0147693 A1 | 6/2013 | Bae |
| 2014/0152718 A1* | 6/2014 | Kwak ...................... G09G 5/10 |
| | | 345/691 |
| 2015/0042697 A1 | 2/2015 | Park et al. |
| 2015/0103108 A1 | 4/2015 | Seong et al. |
| 2016/0335965 A1 | 11/2016 | Huang et al. |
| 2016/0343301 A1* | 11/2016 | Choi .................... G09G 3/3208 |
| 2017/0069266 A1 | 3/2017 | Nathan et al. |
| 2017/0076660 A1 | 3/2017 | Lee |
| 2017/0345377 A1 | 11/2017 | Oh et al. |
| 2018/0342200 A1 | 11/2018 | Morris et al. |
| 2020/0357336 A1 | 11/2020 | Xu et al. |
| 2020/0365091 A1 | 11/2020 | Pyun et al. |
| 2021/0173249 A1* | 6/2021 | Kawashima ............. G09G 3/20 |
| 2022/0157234 A1 | 5/2022 | Kim et al. |
| 2022/0199042 A1 | 6/2022 | Ban et al. |

* cited by examiner

CORRECTING IMAGERY WITH DIFFERENTIAL APPLIED SCALARS

CROSS REFERENCE TO RELATED APPLICATIONS

This application claims priority to U.S. Patent Application Ser. No. 63/376,536, filed Sep. 21, 2022, the entirety of which is hereby incorporated herein by reference for all purposes.

BACKGROUND

In certain displays such as organic light-emitting diode (OLED) displays, the display can age over time so that displayed content can be less bright. This aging can happen unevenly over the display. When this uneven aging becomes visible to the user for specific content being shown, this is known as "burn-in" and is an undesirable effect.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

The present disclosure is directed to systems and methods for applying scalars to generated corrected image data that compensates for variable pixel degradation. The approach includes (1) receiving input image data configured to cause display of imagery on a display with a commanded luminance at each of a plurality of pixels; (2) determining, for each pixel, a degradation value; (3) determining, for each pixel, based at least on the degradation value, an elevated drive current needed to cause the pixel to produce its commanded luminance; (4) determining, for each pixel, a required scalar for the elevated drive current to prevent a drive current threshold from being exceeded when the pixel is being driven; (5) determining, for each pixel, an applied scalar to be applied to the elevated drive current of the pixel when the pixel is being driven, wherein for at least some pixels, the applied scalar for a first pixel is based at least on [1] the required scalar of a second pixel and [2] a spatial relationship between the first pixel and the second pixel; and (6) outputting corrected imagery using the applied scalars to control driving of the pixels.

DETAILED DESCRIPTION

Figure 1:
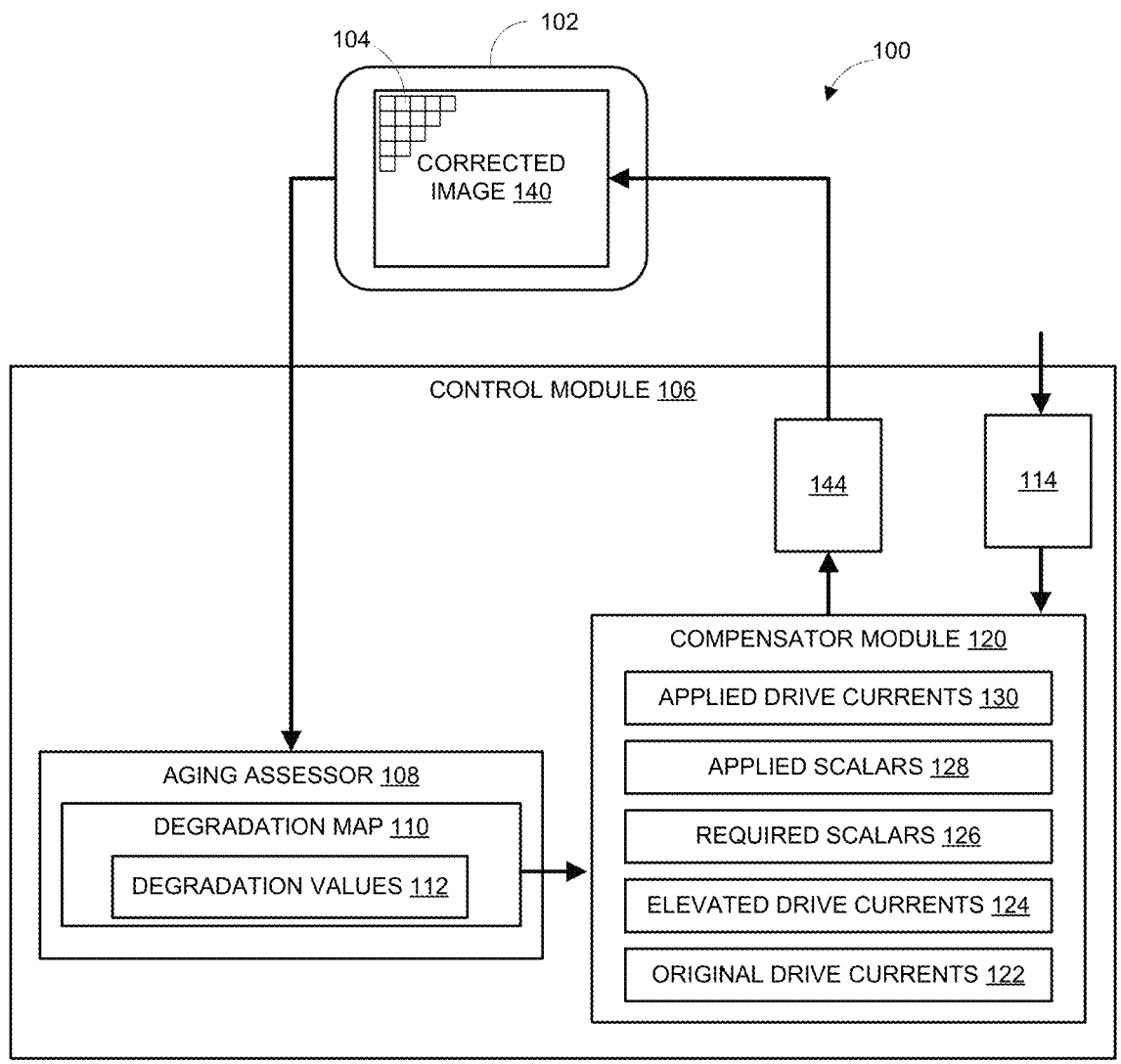
FIG. 1 schematically depicts an example system for providing differential compensation for display pixels.

Display brightness in various displays (e.g., OLED display) decreases over time, due to general aging of pixels and as a function of the luminance of the content displayed at the pixels over time. This degradation can be non-uniform over the screen, i.e., different pixels can be degraded to different degrees. For example, it is well-known that long-term display of static content in one location can cause a noticeable brightness variation relative to other locations depending on the sampled image being displayed.

The profile of this brightness reduction across the display will be referred to herein as the "degradation map." Typically, this map is normalized or referenced against a maximum luminance on the display panel, and degradation values refer to how deficient pixels are in their ability to provide luminance relative to a non-degraded pixel. The degradation may be defined/characterized in various ways. One industry definition specifies an equivalent time that a pixel has been driven at a given luminance.

Regardless of the specific aging definition, the degradation value may be equivalently expressed via a luminance percentage, which will be used herein for purposes of clarity. Specifically, the degradation value for a pixel will range from 0% (fully degraded) to 100% fully non-degraded. In some portions of the present discussion, this range will be expressed as being from 0.0 to 1.0. Thus, for a reference commanded luminance RCL, a degradation value of 0.9 would yield 0.9*RCL (90%). "Commanded luminance" in the present disclosure generally refers to that which is desired in relation to the original input data for the pixel.

When a particular image is to be displayed, the variable pixel aging reflected in the degradation map can result in an image that exhibits a "burn-in" effect. Specifically, some pixels will produce, to varying degrees, less than their commanded luminance for the image. This burn-in may be visible to the user at different levels and locations on the display. Furthermore, burn-in can vary depending on the specific image content, such that visible burn-in can look different across different images. In many cases, burn-in can be a larger problem in areas of relatively uniform brightness.

Manipulation of drive current can be used to correct burn-in. An elevated drive current can be applied bring pixel luminance up to the desired commanded luminance associated with the image being displayed. Assuming constant efficiency (cd/A) as a function of current, the luminance and current are directly proportional. Thus, if 10% more luminance is desired due to degradation, 10% more current can be applied for the elevated drive current. In general, if a pixel has been degraded to a degradation value D(px)=X, the desired luminance can be achieved by applying 1/X luminance (1/X times the original drive current). For example, if degradation D(px) for a given pixel=0.91, then 1.10 times the original drive current must be applied as an elevated drive current to achieve the commanded luminance. For clarity, constant efficiency will be assumed in the following examples. It will be appreciated, however, that the differential compensation techniques described herein apply equally even if efficiency is not constant with current.

The above current manipulation may be unfeasible in some settings, however. It can require additional current and power consumption. Specifically, boosting a pixel's current according to its degradation may call for an elevated drive current that exceeds a maximum drive current for the display. In some examples, the maximum drive current herein may be Iw, corresponding to the current level that produces a fully white pixel. The present discussion, however, contemplates use of any maximum drive current $I_{MAX}$ that is a desirable cap.

A scalar can therefore be applied to ensure that a maximum current level $I_{MAX}$ is not exceeded. For example, a scalar RS ("required scalar") can be applied to stay within this limit. That means the applied current, $I_{APPLIED}$ would be held to $I_{MAX}$ via an appropriate required scalar RS:

$$I_{applied}=RS*I_O/D(px),$$

With $I_O$ being the original current indicated for driving the pixel. The $I_O/D(px)$ term may be referred to in later examples as the "raw current multiplier Cx".

The more degraded a pixel is, the larger the elevated drive current $I_E$ needed to get the pixel to the commanded luminance. If $I_E$ would exceed $I_{MAX}$, then a required scalar RS is employed to hold current to $I_{MAX}$. Thus, for an individual pixel, RS is dependent not only on degradation D(px), but also on the commanded luminance for the pixel. For example, if commanded luminance is very low, a significantly degraded pixel may might still be driven with the full elevated drive current $I_E=I_O/D(px)$ without exceeding $I_{MAX}$. On the other hand, if commanded luminance is high, $I_E$ could exceed $I_{MAX}$ even for a modestly degraded pixel, thus necessitating some level of current downscaling via a required scalar RS.

In some prior approaches, a common applied scalar AS is generated for the whole display based on the lowest required scalar RS (lower RS values produce larger current downscaling). Accordingly, the pixel whose calculated elevated current $I_E=I_O/D(px)$ causes the greatest elevation beyond the maximum current $I_{MAX}$ results in the lowest RS for the image. This lowest RS (largest current downscaling) is then used as the same applied scalar AS for all the pixels to produce a compensated/corrected output image.

The above common AS approach offers complete compensation on the current image for the entire display. However, since it is accommodating the worst-case current downscaling (lowest RS), this compensation can cause an appreciable drop in brightness across the image, including in non-degraded areas. The present disclosure therefore contemplates using diminished AS near more degraded areas, with less or no diminishment away from these areas. The applied scalar AS at any region may be considered as the level of compensation at that region of the image. The present discussion addresses tuning differential compensation scalars AS across the display.

In this context, "degraded compensation areas" can refer to required scalar RS values that necessitate current downscaling in a particular image frame, in contrast to the use of "degraded" for D(px) values in a degradation map. Specifically, "degraded compensation areas" refers to the need for current down-scaling—i.e., RS<1.0 for the corresponding pixels. Thus, the degradation map value D(px) for a pixel does not necessarily correlate with an area being degraded in the image. For example, at a very dark portion of the image, highly aged pixels may be boosted without causing a maximum current to be exceeded. Thus, an RS of 1.0 may apply at such pixels (no current down-scaling). However, in a subsequent frame where those pixels were in a region of high brightness, RS could be less than 1.0.

The approach described herein contemplates differential compensation, in which higher degrees of downscaling (more compensation) are used in areas of the display that are more degraded for the image. An aggressive version of this approach would involve basing the applied scalar AS for each pixel/position upon its required scalar RS (e.g., AS=RS). This highly differential compensation would compensate each pixel/region individually to avoid $I_{MAX}$, though compensation transitions could be very perceptible to the user—e.g., producing distortion as undesirable as the burn-in being mitigated. Accordingly, the present disclosure presents a graded approach that uses differential scalars with smoothed transitions in compensation. This can preserve luminance to a high degree in undegraded areas while providing adequate/full compensation in and around the most degraded areas. Further, the techniques ensure that maximum current levels are not exceeded to preserve power and stay within display current requirements.

Referring now to FIG. 1, a system 100 is depicted for providing spatially varying compensation in the context of differentially degraded pixels. The spatial variation is implemented in part by using different applied scalars AS for different pixels. The system includes a display 102 having pixels 104 for displaying imagery. Typically, display 102 is an OLED display, though it can be any type of display subject to burn-in. Operatively coupled to display 102 is a control module 106 for performing various to-be-described functions. Module 106 can include or be implemented as a display driver for driving imagery on display 102. In other examples, the functionality of module 106 can be implemented in part or entirely in software. Any suitable embodiment may be employed to implement the smoothed differential compensation described herein.

Over time, as described above, the pixels of display 102 can degrade such that a given control signal (e.g., current level) produces less luminance relative to commanded luminance. Compensation typically involves knowing the aging of individual pixels on the display. In the current example, an aging assessor 108 tracks aging degradation D(px) for each pixel. Tracking can include pixel counting operations that observe how a pixel is driven over time, for example by logging how often, and for how long, the pixel was activated at various brightness levels. Such tracking in some cases can be for the entire life of the display, with data maintained in aging assessor 108 or another appropriate storage. In other examples, aging assessor 108 can employ direct sensing methods of detecting pixel aging, e.g., by periodic measuring of electrical or material characteristics of pixels.

Regardless of how aging is tracked or detected, a degradation map 110 is determined. This map typically is relatively static. For example, it normally will remain largely unchanged, or only minimally change, over periods of days, weeks, etc. As indicated above, the degradation map 110 describes the aging D(px) of individual pixels or groups of pixels. It may generally be characterized as the loss in luminance relative to an initial benchmark for a given driving current. For example, a degradation value D(px) indicate a pixel providing 95% (0.95) of its baseline luminance. Any other metric can be employed, however, to characterize relative degradation of pixels. The degradation map 110 is shown as being stored or held within aging assessor 108, though it can be stored in and/or retrieved from any other suitable location. Using the above-described convention, D(px) may be between 0.0 and the fully undegraded level of 1.0. As described above, D(px) values in the degradation map do not necessarily correlate with the respective pixels degrading the image (e.g., with visible burn-in).

Continuing with FIG. 1, control module 106 holds uncorrected image data 114 to be displayed on display 102. An individual frame of uncorrected imagery is shown though it will be appreciated that multiple frames will be received and processed by system 100. Each frame of uncorrected image data is configured to cause display of associated imagery on display 102. Uncorrected image data 114 can supplied as input image data to control module 106 from any suitable location. This image data is uncorrected in the sense that its pixel drive currents may produce burn-in or other undesirable artifacts due to interaction of non-uniform pixel aging with the specific content of the image data. Accordingly, as described in detail below, various methods are employed to achieve corrections that balance burn-in with minimal impacts on brightness. This is performed through a smoothed deployment of applied scalars AS and results in "corrected image data" and associated "corrected images."

A compensator module 120 can be implemented within control module 106 or in another suitable location. Among other things, compensator module 120 considers D(px) of pixels 104 specified in degradation map 110 and their commanded luminance. In response, the module produces appropriately scaled drive current to produce corrected imagery. Compensator module 120 receives degradation values 112 (D(px)) for pixels 104 from degradation map 110. Compensator module 120 also receives uncorrected image data 114, and from that determines original drive currents 122 ($I_O$) that would be needed, in the absence of aged pixels, to produce the commanded luminance at each pixel 104.

Based on the aging D(px) of the pixels, the module determines elevated drive currents 124 ($I_E=I_O/D(px)$) that would be needed, accounting for aging, to produce the commanded luminance at each pixel. It will be noted that for non-aged pixels with degradation value of 1.0, $I_E=I_O$. Then, required scalars 126 RS are determined for each pixel to ensure that elevated drive current 124 does not exceed the maximum permitted current $I_{MAX}$. In some cases, the RS for a pixel will be 1.0 (no current down-scaling). In other cases, as when $I_E > I_{MAX}$ for a pixel 104, the RS will be less than 1.0 to specify a certain amount of down-scaling to avoid exceeding the maximum current limit.

The RS value may be considered to specify or reflect the minimum amount of required compensation avoid exceeding current limits. The applied scalar AS value specifies the actual compensation to be applied. In some cases the applied compensation is the same as the required compensation. In other cases, more downscaling compensation is employed (AS<RS for a pixel/region) to smooth variations in compensation. As will be further explained, such smoothing can be employed in buffer/transition regions around degraded areas of the image.

Referring again to actual compensation, applied scalars AS 128 are generated by compensator module 120. The applied scalars 128 are then applied to scale drive currents 122 into applied drive currents 130. The applied drive currents are then used to drive pixels 104 and thereby produce corrected imagery 140. The applied scalars and/or applied drive currents may be represented as or encompassed within corrected image data 144. Instead of compensating with an applied scalar equal to the required scalar for each pixel (AS=RS), the present innovation contemplates a less aggressive, but still differential, compensation approach, for example in areas that are near/adjacent regions of degraded compensation. Specifically, some areas are assigned applied scalars AS that are smaller than their required scalars RS based on their spatial relationship (e.g., distance from) to areas that are more degraded for the image. The determined applied scalars can be updated rapidly, and typically are recalculated for every frame of imagery.

This use of applied scalars that are less than their individual RS requirement can provide the technical benefit of increased/full compensation in degraded areas with an adjacent softening of the applied scalar compensation. Moving further away from the degraded regions, the diminishment of the applied scalars tapers off to preserve brightness in those areas that are distant from the degraded areas. The softening/tapering reduces/eliminates perceptibility of the differential compensation.

Figure 2:
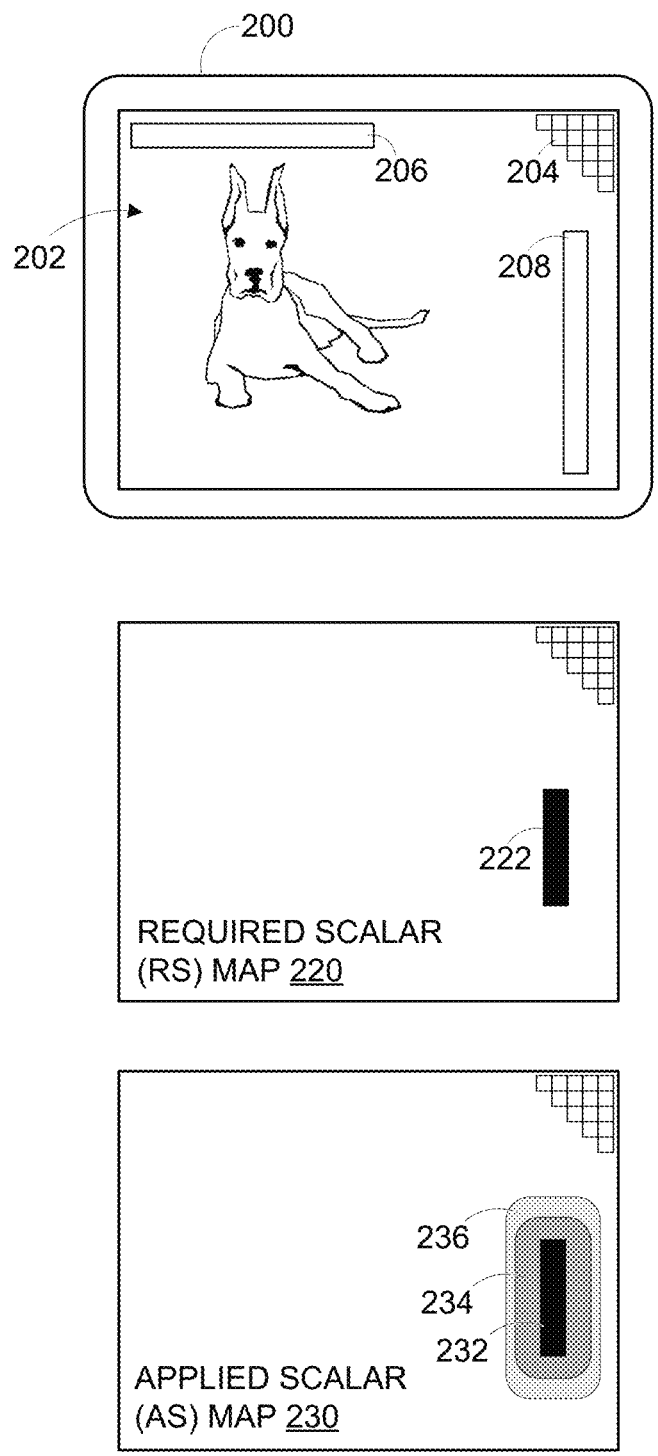
FIG. 2 depicts an example of determining differential compensation scalars for burn-in features caused by degraded pixels.

FIG. 2 depicts an example relationship between pixels, burn-in features, and various associated scalars. For clarity of discussion, the depiction is highly simplified relative to real-world scenarios. At the top of the figure, a display 200 is shown displaying an uncorrected image 202 that is made visible via activation of a plurality of pixels 204 of the display. A small number of representative pixels 204 are shown in the upper right corner of display 200. Uncorrected image 202 is presented as a simple line drawing for clarity; color is not shown, nor are shading, variations in intensity, features in other parts of the image frame, menus, GUI elements, etc. It will nonetheless be appreciated that the discussion relates to any imagery vulnerable to burn-in or other pixel aging issues.

Schematically represented in FIG. 2 are two potential burn-in features 206 and 208 that would be visible absent current compensation. Such burn-in features might correspond to frequently displayed content—e.g., a menu feature, GUI element, etc. Features 206 and 208 are presented in simplified schematic form; it will be appreciated that potential burn-in areas can vary in size, complexity, subtlety, pixel size/granularity, etc.

Scalar map 220 is a required scalar RS map for pixels 204 in connection with the displayed image. As previously described, the RS at a pixel is the scalar value needed to ensure that the applied drive current at a pixel (e.g., current 130) does not exceed a maximum current $I_{MAX}$ (e.g., maximum white pixel current); it reflects the minimum required compensation for the pixel.

The above contemplates three scenarios: (1) Scenario 1 (D(px)=1.0, RS(px)=1.0) A completely non-degraded pixel (D(px)=1.0) will have an elevated drive current $I_E$ that is equal to the original drive current $I_O$. Thus, the maximum current $I_{MAX}$ is not exceeded and RS=1.0 (no downscaling); (2) Scenario 2 (D(px)<1.0, RS(px)=1.0) A pixel is degraded to some extent (D(px)<1.0) in the degradation map 110 and the elevated drive current $I_E$ therefore does exceed the original drive current $I_O$ but does not exceed $I_{MAX}$—perhaps due to that portion of the image being relatively dark. This scenario also results in an RS=1.0 and no current downscaling; In other words, compensation is not degraded and luminance can be fully compensated; (3) Scenario 3 (D(px) <1.0, RS(px)<1.0) Some level of aging in the degradation map (D(px)<1.0) results in $I_E > I_O$ and $I_E > I_{MAX}$, necessitating a downscaling of the elevated current to keep the applied current below the maximum limit. RS is thus <1.0 and compensation is limited/degraded in this area because the current cannot be brought up to the full level needed for commanded luminance.

Still referring to scalar map 220, the white areas are undegraded image regions and correspond to no current downscaling, or an RS=1.0. In connection with burn-in feature 206, it will be noted that RS=1.0, corresponding to Scenario 2 above. These portions of image 202 are "able to be fully luminance compensated" despite the corresponding pixels having a D(px)<1.0 in the degradation map. It will further be noted that RS=1.0 for some of burn-in feature 208, reflecting that those areas also correspond to Scenario 2 above—i.e., pixels are degraded but the elevated drive currents indicated for compensation do not exceed the current limit.

In contrast, the map area 222 for a subset of burn-in feature 208 is black representing a degraded image portion with RS<1.0 (Scenario 3). Such a situation might occur, for example, in the case of relatively degraded pixels in very bright portions of the image. In that event, scaling up the original current by the inverse of degradation would push drive currents above $I_{MAX}$. Thus, RS<1.0. Accordingly, map area 222 is the only region where the required minimum compensation involves some amount of current downscaling.

Scalar map 230 is an applied scalar map for the pixels of uncorrected image 202. Scalar map 230 constitutes the set of applied scalars AS to be used in generating the compensated/corrected image. These scalars are applied to the original drive currents to generate applied drive currents for generating the output image. In some cases, the applied drive currents are equal to the original drive currents (AS=1.0). At other pixels, the applied scalar produces some amount of compensation—i.e., an applied drive current that is less than the original drive current.

Applied scalar map 230 includes three regions corresponding to the map area 222 of required scalar map 220: interior region 232; middle peripheral region 234; and outer peripheral region 236. As indicated by the progressively lighter shading, the applied scalar AS values decrease moving outward from interior region 232. This reflects interior region 232 having the smallest AS; middle peripheral region 234 having an in-between AS; and outer peripheral region 236 having a still larger scalar AS (but still less than 1.0). Outside these areas, an applied scalar of AS=1.0 is used. Discrete regions are depicted for clarity—in typical examples, the applied scalar value will gradually decrease with increasing distance from pixels with higher required scalar values.

From the above, it will be appreciated that the applied scalar AS for a pixel is determined based on its spatial relationship to another pixel and the RS for that other pixel. In one example, a first pixel P1 and a second pixel P2 have respective required scalars $RS_{P1}$ and $RS_{P2}$, with $RS_{P1} > RS_{P2}$. Thus, pixel P2 is more degraded for the image. If the two pixels are compensated without reference to one another, the AS values for each ($AS_{P1}$ and $AS_{P2}$) might be set to be equal to their respective RS values. This high-spatial-frequency approach produces sharp, and likely visible, transitions in compensation, causing distortion in the output image.

The transition can be smoothed/graded/softened in various ways by decreasing $AS_{P1}$ by some amount from $RS_{P1}$, thereby downscaling more than would be specified by its RS. The degree to which pixel P1's applied scalar $AS_{P1}$ is reduced from its required scalar $RS_{P1}$ may be based on a distance between pixel P1 and P2, and or on relative levels of the required scalars of those pixels. Typically the influence of pixel P2 on the applied scalar reduction of pixel P1 will decrease with larger distances between the pixels.

In FIG. 2, certain applied scalars are reduced as just described in regions 234 and 236, and those regions reflect that the transition-softening mechanism can extend to regions and groups of pixels around an area of local maximum degradation, such as region 232. In particular, degraded areas can be surrounded by buffer regions of elevated compensation, in which pixels are compensated with current downscaling beyond that dictated by their RS values. In other words, applied scalars AS in these buffer regions are made smaller due to their proximity to locally degraded areas. Compensation tapers with increasing distance from degradation, such that luminance can be preserved as much as possible at distant areas.

The buffer-region transition softening can be determined according to any function/criteria, for example by taking into account a pixel's distance from a degraded pixel/position; relative amounts of image degradation RS; spatial frequency of RS value variations; commanded luminance of either/both pixels; degradation of other pixels; commanded luminance of other pixels; blurring applied to scalars of one or more pixels; etc. Regarding distance, as described above, many examples contemplate that the influence of a local minimum RS on the AS values at other pixels will decrease with greater distance. AS changes from frame to frame can play a role, as large/rapid changes could result in undesirable visible artifacts. In other words, the applied scalars for one image frame can be based on how much the applied scalars have changed from the immediately prior frame, and/or across one or more frames prior to that. This might be done, for example, to moderate such changes so that they are smoothed and thereby made less perceptible to the user.

Figure 3:
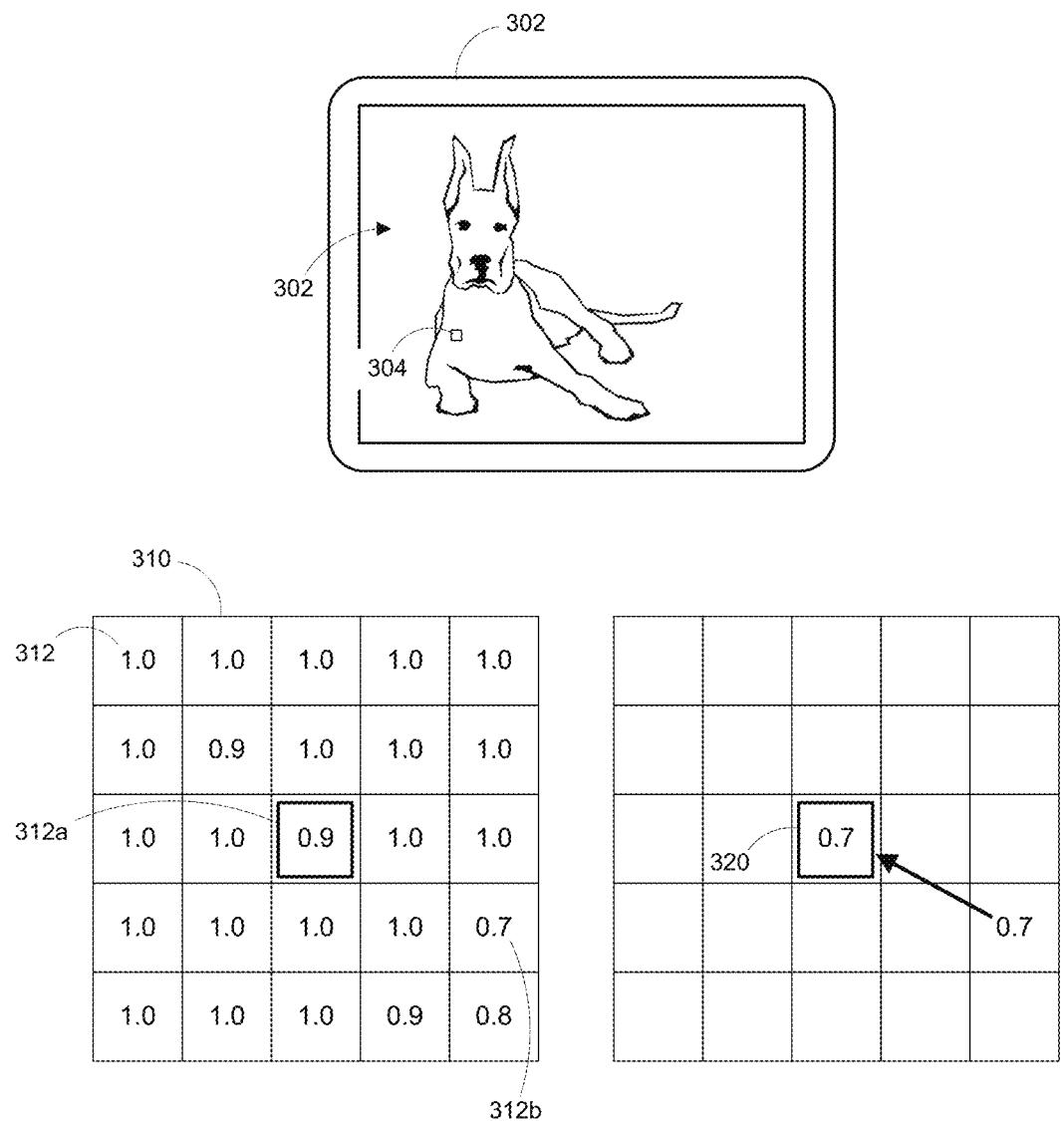
FIG. 3 depicts another example method for determining differential compensation scalars.

Referring now to FIG. 3, an example method will be described for generating scalars and performing luminance compensation in which an applied scalar AS for a given pixel can be determined by a spatial relationship it has with another pixel that is more degraded (i.e., smaller required scalar RS). The method will be described in the context of determining an applied scalar for an individual pixel 304 of image 302 on display 300. As described with reference to AS map 230 of FIG. 2, the method of FIG. 3 involves a moderating of the transitions between RS values to generate diminished AS values near degraded areas.

In relation to pixel 304, a partial required scalar map 310 for image 302 is shown. For each pixel in a 7×7 grid of contiguous pixels around pixel 304, the map shows a required scalar RS value 312 for the associated pixel. The required scalar RS value for pixel 304 is shown at 312a. In the present example, the pixel corresponding to the required scalar value at 312b is the most degraded pixel, and has the smallest required scalar.

In the example, partial required scalar map 310 is a window/region of values for pixels around the pixel of interest 304, and is used to determine the applied scalar AS for pixel 304. In this approach, the pixel of interest is scaled according to the most degraded pixel within the search window. In this case, the pixel associated with value 312b has the smallest required scalar RS and is this is the most degraded within the local search window. The plot to the right indicates pixel 304 being assigned an assigned scalar 320 based on the most degraded pixel. In this example, this assignment is performed by giving pixel 304 an assigned scalar value that is equal to the required scalar of the most degraded local pixel, or 0.7.

In this example, an approach is being used that parallels that of FIG. 2. In particular, an applied scalar AS is determined at one pixel based on its spatial relationship to another, more degraded, pixel (namely, the AS is decreased from its RS due to it being near a pixel that is more degraded for the image). This most-degraded-within-radius approach can be implemented in a variety of ways. Typically, the window calculation is repeated and made for each pixel on the display to obtain assigned scalars, though fewer pixels can be used. Any suitable size or shape region can be employed. The same size/shape can be applied for each pixel calculation in the frame, or the size/shape can vary for different portion/pixels of the display. Size/shape of the region may further vary from frame to frame of images.

In some cases, larger search regions can produce a greater averaging and/or smoothing effect so that the spatial frequency of AS scalar variation is lower. These large regions can produce more downscaling and heavier compensation around regions of higher degradation. As the search region around a pixel for which AS is being determined increases, the compensation effect becomes less differential and moves toward that achieved through application of a common scalar across the panel.

As with the example of FIG. 2, the net effect is to preserve the scaling (or lack thereof) for different regions of the display. This can provide sufficient compensation where needed, preserve brightness elsewhere, and smooth transitions between these areas to reduce/eliminate perceptibility due to scalar variation. As described below, the result of this radius approach can create areas of uniformity with relatively sharp edges. Accordingly a blurring operation (e.g., Gaussian) can be employed to smooth the calculated applied scalars AS and attendant compensation. Blurring/smoothing of scalars will be further described with reference to FIG. 4.

Figure 4:
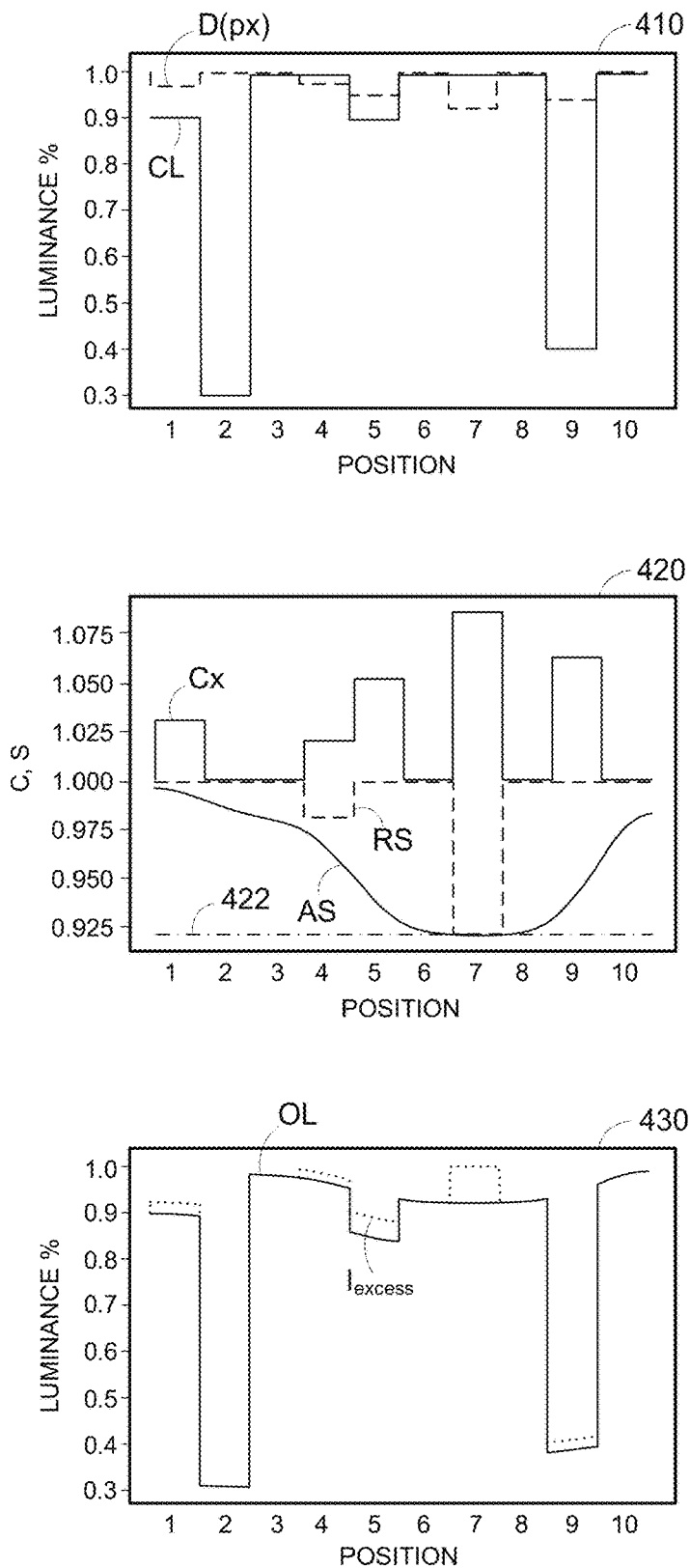
FIG. 4 depicts various plots showing scalar determination and compensated output for multiple pixel/display regions.

Referring now to FIG. 4, various plots are shown to illustrate further examples of diminishing applied scalar values based on proximity or other spatial relationship to degraded positions.

The figure depicts a commanded luminance and degradation plot 410; a scalar plot 420; and an output plot 430. Each plots values associated with linearly adjacent position on a display—i.e., values for Position 1, Position 2, . . . Position 10. These positions can each correspond to a pixel or to multiple pixels. Plot 410 indicates commanded luminance CL and degradation D(px) for each position—D(px) is the static aging. For example, at Position 2, the image calls for relatively low luminance (~30%) and the position is undegraded—D(px)=1.0. At Position 7, 100% luminance is commanded, but D(px) is roughly 0.9. Positions 1, 4, 5, 7 and 9 are have D(px)<1.0 to varying degrees, and thus potentially are subject to needing a required scalar RS<1.0 to stay below maximum current.

Scalar plot 420 indicates a raw current multiplier Cx for each position. This value is the inverse of degradation for the relevant pixel (1/D(px)) and specifies the multiplier to be applied to the original drive current to yield the commanded luminance of plot 410. It will be noted that this value is greater than 1.0 for each of the degraded positions 1, 4, 5, 7 and 9. For example, Position 5 needs about 1.05× of original current to achieve the luminance indicated for Position 5 on plot 410. The multiplier for the non-degraded Positions 2, 3, 6, 8, and 10 is 1.0 because original current does not need to be increased.

The dashed line in plot 420 reflects the required scalar RS for each position. This plot illustrates the three scenarios described above with reference to FIG. 2. In Scenario 1, the pixel is not degraded. Therefore, the raw current multiplier is 1.0 and does not scale up the original current. Thus, the required scalar is the maximum RS=1.0 and no downscaling is needed to stay below the current limit. This corresponds to non-degraded Positions 2, 3, 6, 8, and 10.

In Scenario 2, the position is degraded to some extent, but that degradation does not require current down-scaling for the image of interest. This corresponds to Positions 1, 5 and 9 in plot—raw current multiplier Cx is greater than 1.0 but the elevated current such multiplication would produce does not exceed the maximum current. Again, RS=1.0 for these positions.

Scenario 3 applies to positions 4 and 7. The elevated current that would arise from the associated raw current multiplier Cx would cause the maximum current to be exceeded and downscaling is thus required such that RS<1.0 for these positions.

Plot 420 also indicates an applied scalar AS to be applied at each of the positions. As in prior examples, the applied scalar is applied to the original drive currents (e.g. drive currents 122 of FIG. 1) to create applied drive currents (e.g., applied drive currents 130) to create a final corrected image. Output plot 430 indicates this output, namely it shows output luminance OL of the corrected image (currents scaled in accordance with applied scalar AS of plot 420). The dashed line at Positions 1, 4, 5, 7, and 9 indicate excess current $I_{excess}$ to account for pixel degradation.

Scalar plot 420 provides a further example of moderating transitions between compensation. Specifically, at each of Positions 1, 2, 3, 4, 5, 6, 8, 9, and 10, the AS value for those positions of interest specifies more current downscaling than RS, due to the spatial relationship of those positions to Position 7, the position of maximum higher local degradation. Notably, a common lowest scalar 422 is not used, which would involve an overall, and undesirable, brightness reduction.

In FIG. 4 and the preceding examples, the smoothing shown at applied scalar AS on plot 420 can be generated with a smoothing function ƒ(smooth) that is applied at each position of interest (Positions 1, 2, etc.). In other words, the specific value AS at the position is determined by the function, and it is applied at each position. A window may be employed to account for characteristics (e.g., RS, luminance, degradation, etc.) for a desired number of adjacent positions. This window can be of any practicable size. The window can be uniform, or vary from position to position, or image frame to image frame.

More generally, the transition-moderating AS value on plot 420 contemplates an approach that is variously applicable to the preceding examples. It can be used also in XY dimensions to address compensation in areas of different degradation (differing RS values). Given a less degraded position (LDP, higher RS) and a more degraded position (MDP, lower RS), compensation is tempered at the LDP based on its spatial relationship to the MDP—it is given an assigned scalar AS that is lower than its RS. In the terminology used above, the LDP might be in a "buffer region" adjacent the MDP. The diminished AS at the LDP can be based on distance between the LDP and MDP; relative/absolute RS values at the LDP, MDP and/or other positions; commanded luminance at the LDP, MDP and/or other positions; size of the MDP or other degraded regions; severity of burn-in; JND values for the image; content of the image; blurring operations or parameters applied to RS scalars or preliminary AS scalar calculations; etc.

Blurring methods can be applied to any of the examples herein where some applied scalars are diminished via a spatial relationship to one or more degraded positions. Blurring can be applied directly to generate a set of applied scalars, or applied to revise a set of preliminary calculated scalars. Such blurring smooths variations in compensation to reduce perceptibility while still providing the benefits of differential compensation. Any suitable method can be employed to blur scalar value transitions, including averaging techniques, rolling windows of varying size, Gaussian blurring, etc. It will be further appreciated that the parameters of any of these techniques can be varied as appropriate. In some cases, the width of a blurring technique will produce desired characteristics in the applied scalar map (the scalar set to be used for the ultimate corrected image). For example, when using convolutional kernel, a wide blur kernel may increase brightness in less-burned areas. Wherever a width parameter is applied in smoothing scalars, such width can be tuned to achieve desired smoothing, including different widths for different parts of an image. For example, in areas with high frequency of variation among RS values, a larger width can be employed. Additionally, the width used for blurring may depend on the level of degradation. For example, an extremely low RS feature may require a large width to reduce perception, but a higher RS can be sufficiently hidden with a narrow width. The level of required compensation may also be adjusted. For example, depending on image content, there may be features where AS>RS within some threshold. It will be appreciated in general that many of the disclosed AS-diminishing techniques can vary from position to position, or image frame to image frame.

A further example of how compensation can be tuned accounts for ambient viewing conditions. For example, a sensor can measure ambient light and the aggressiveness of the differential compensation can be adjusted accordingly. For example, a less aggressive scalar approach may be used to maintain luminance under bright ambient conditions.

Regarding the above examples and the other discussions herein of blurring, smoothing, etc., perceptibility of burn-in and/or differential compensation can change significantly from image to image and for different portions of an image. Perceptibility assessments accordingly can be made at any level of granularity within one or more portions of an image, or from frame to frame. Perceptibility levels and variations can therefore indicate the use blur in a multitude of different ways that can spatially vary over an image and dynamically/temporally across multiple images. This provides the technical benefit of reducing/eliminating visible artifacts that could be produced by using different AS scalars.

Figure 5:
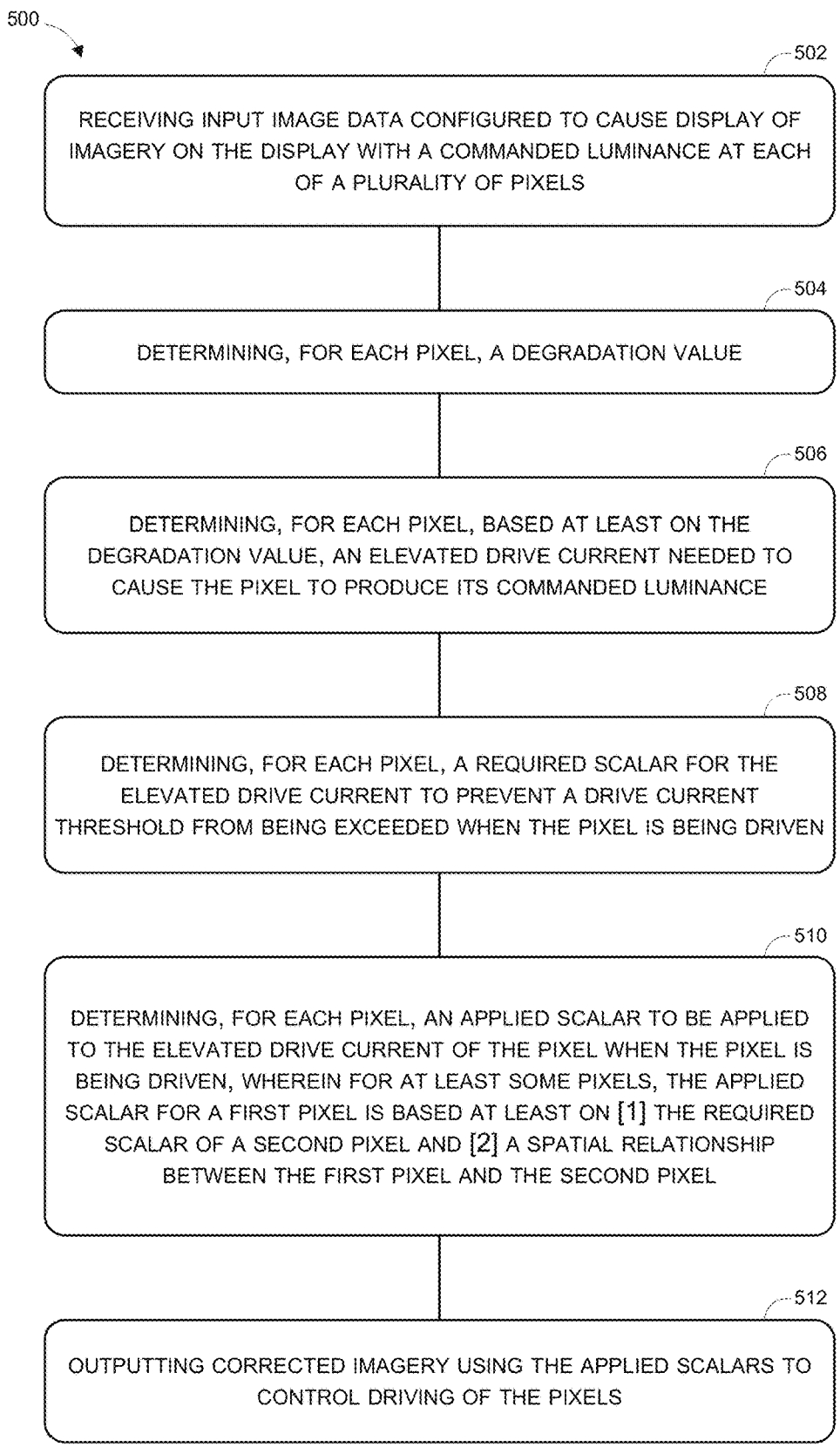
FIG. 5 is a flowchart depicting another example method for determining differential compensation scalars and using those scalars to output corrected images.

FIG. 5 depicts a method 500 for providing variable compensation of pixels when driving imagery to a display. At 502, method 500 includes receiving input image data configured to cause display of imagery on the display with a commanded luminance at each of a plurality of pixels. Input imagery can be received from any source and/or stored in any suitable location prior to being received. Such input image data is uncorrected, in the sense that absent compensation, it will result in an output image exhibiting burn-in due to pixel aging.

At 504, method 500 includes determining, for each pixel, a degradation value. The degradation value D(px) can be determined by historically tracking content driven to the pixel, directly sensing characteristics of the pixel, or through any other suitable methods. Degradation values can be expressed in various ways. Regardless of definition, the relative degradation of one pixel to another can be expressed in normalized percentage terms. For example the degradation value of a non-degraded pixel would produce 100% of commanded luminance for a reference drive signal, with another pixel having a D(px) of 0.9 producing 90% of commanded luminance. Degradation values typically are stored in a degradation map, such as degradation map 110 of FIG. 1. As described elsewhere, a degraded pixel may not necessarily contribute to degraded areas of a particular image. Image degradation instead may be correlated with the required scalar RS as described above, with smaller scalars equating to more current downscaling and more dimming of the output image. Such image degradation typically is localized, and the approaches herein contemplate increased compensation around these areas while preserving brightness elsewhere.

At 506, method 500 includes determining, for each pixel, based at least on the degradation value, an elevated drive current needed to cause the pixel to produce its commanded luminance. As in prior examples, such elevated drive current is reflected by multiplying original drive current by the inverse of the pixel map degradation, or $I_E=I_O/D$ (px).

At 508, method 500 includes determining, for each pixel, a required scalar for the elevated drive current to prevent a drive current threshold from being exceeded when the pixel is being driven. Such a required scalar RS is needed when the raw current multiplier would cause $I_E$ to be great than $I_{MAX}$. The greater the excess, the smaller the RS, which in turn means that the relevant pixel is causing more local degradation (e.g., dimming) to the image.

At 510, method 500 includes determining, for each pixel, an applied scalar AS to be applied to the elevated drive current of the pixel when the pixel is being driven, wherein for at least some pixels, the applied scalar for a first pixel is based at least on [1] the required scalar of a second pixel and [2] a spatial relationship between the first pixel and the second pixel. As described in reference to FIG. 4, this step involves a moderation of how variable the compensation would be if the applied scalar AS were set to be equal to RS for each pixel/position on the display. Instead of such fully-differential compensation, the applied scalar AS for some pixels is set be lower than its RS, due to the pixel's spatial relationship to pixels/areas that are more degraded. Any of the methods discussed with reference to the prior figures can be employed to achieve such moderation.

At 512, method 500 includes outputting corrected imagery using the applied scalars to control driving of the pixels. These applied scalars are used in this step to downscale, if necessary, the elevated drive currents of step 506.

A simplified three-region example summarizes the above approaches. A first region is an area of localized high degradation with RS values around 0.8. A second region is undegraded (RS values 1.0) and is relatively distant from the degraded area. A third region is an intervening region that is spatially closer to the degraded region, but similarly exhibits no degradation (RS values also 1.0). Instead of using RS=1.0 in the intervening region, the assigned scalars can be decreased somewhat, say to 0.85, to moderate the differential compensation and produce compensation closer to that used for the degraded region. As discussed at length throughout this disclosure, a wide variety of methods can be used to achieve such graded/moderated differential compensation. This can remove visible burn-in features through full compensation, preserve brightness in non-degraded areas, and eliminate/reduce perceptibility caused by the differential compensation. Relative to a uniform scalar approach, brightness is not sacrificed in non-degraded areas due to accommodating the greatest degradation. Low luminance is restricted to visible burn-in areas while preserving luminance at distant areas.

Various methods can be employed to assess the regionalized compensation approaches herein and balance luminance preservation with minimizing perceptibility of burn-in features and/or differences in scalar compensation. For measuring luminance loss, the RGB values of each pixel can be converted into XYZ values for given spectral and luminance input for each of the 3 subchannels. The Y in XYZ is the luminance, Computing the average pixel luminance before ($\overline{Y}_O$) and after ($\overline{Y}'$) degradation, the average luminance loss can be computed as $$L_{loss} = \frac{Y'}{Y_0}$$

Perceptibility of burn-in features or artifacts due to given set of graded applied scalars may be assessed via Just Noticeable Difference (JND). JND uses a convolution that represents the human visual system to assess local contrast sensitivity. JND creates a map of the image with the value at a location related to the perceptibility of local contrast differences in that area. A JND of 1 is designed to be the lower limit of human perception, with increasing JND becoming more visible. To calculate perceptibility of burn-in features or compensation variation in an image that may itself have high JND, the JND map of the degraded image can be subtracted from the JND map of the undegraded/corrected image, thus creating a difference ΔJND. Using this method, it has been found that positive values correspond to artifact perceptibility. Negative values entail contrast reduction to reduce perceptibility. Within the range of contrast reduction observed in expected burn-in or compensation artifacts, these contrast reductions are found to be imperceptible and can be discounted in considering scalar adjustments. These JND contrast sensitivity assessments can be used to tune candidate assigned scalars to adjust them (e.g., with a modified blurring algorithm, different size window/region, etc.) to produce modified compensation via a subsequent set of applied scalars.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
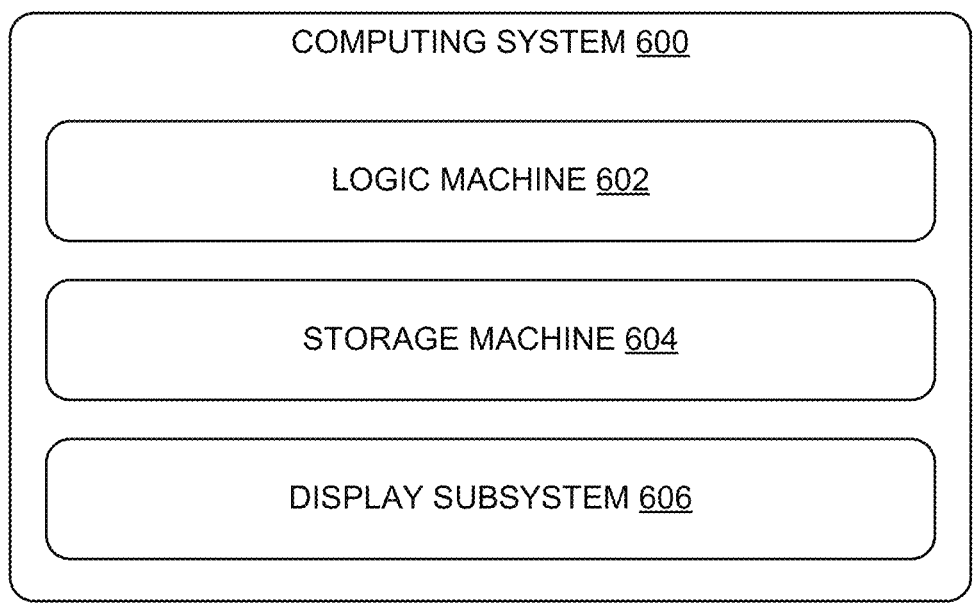
FIG. 6 is an example computing system configured to implement differential scalar compensation.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 can optionally include a display subsystem 604, and/or other components not shown in FIG. 6.

Logic machine 602 includes one or more physical devices configured to execute instructions. For example, the logic machine can be configured to execute instructions that are part of one or more applications, services, programs, routines, libraries, objects, components, data structures, or other logical constructs. Such instructions can be implemented to perform a task, implement a data type, transform the state of one or more components, achieve a technical effect, or otherwise arrive at a desired result.

The logic machine can include one or more processors configured to execute software instructions. Additionally or alternatively, the logic machine can include one or more hardware or firmware logic machines configured to execute hardware or firmware instructions. Processors of the logic machine can be single-core or multi-core, and the instructions executed thereon can be configured for sequential, parallel, and/or distributed processing. Individual components of the logic machine optionally can be distributed among two or more separate devices, which can be remotely located and/or configured for coordinated processing. Aspects of the logic machine can be virtualized and executed by remotely accessible, networked computing devices configured in a cloud-computing configuration.

Control module 106, aging assessor 108 and compensator module 120 can be implemented using any of such logic machine 602 componentry. For example, compensator module 120 may be part of a processor or hardware-implemented display driver that retrieves image and degradation data for pixels, and outputs compensated image data for corrected images.

Storage machine 604 includes one or more physical devices configured to hold instructions executable by the logic machine to implement the methods and processes described herein. When such methods and processes are implemented, the state of storage machine 604 can be transformed—e.g., to hold different data. Such stored data can include degradation values from degradation map 110 and image data.

Storage machine 604 can include removable and/or built-in devices. Storage machine 604 can include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 can include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively can be propagated by a communication medium (e.g., an electromagnetic signal, an optical signal, etc.) that is not held by a physical device for a finite duration.

Aspects of logic machine 602 and storage machine 604 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of computing system 600 implemented to perform a particular function. In some cases, a module, program, or engine can be instantiated via logic machine 602 executing instructions held by storage machine 604. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

It will be appreciated that a "service", as used herein, is an application program executable across multiple user sessions. A service can be available to one or more system components, programs, and/or other services. In some implementations, a service can run on one or more server-computing devices.

When included, display subsystem 604 can be used to present a visual representation of data held by storage machine 604. This visual representation can take the form of a graphical user interface (GUI). As the herein described methods and processes change the data held by the storage machine, and thus transform the state of the storage machine, the state of display subsystem 604 can likewise be transformed to visually represent changes in the underlying data. Display subsystem 604 can include one or more display devices utilizing virtually any type of technology. Such display devices can be combined with logic machine 602 and/or storage machine 604 in a shared enclosure, or such display devices can be peripheral display devices.

A method for a display is provided according to one example. The method includes (1) receiving input image data configured to cause display of imagery on the display with a commanded luminance at each of a plurality of pixels; (2) determining, for each of the plurality of pixels, a degradation value; (3) determining, for each of the plurality of pixels, based at least on the degradation value, an elevated drive current needed to cause the pixel to produce its commanded luminance; (4) determining, for each of the plurality of pixels, a required scalar for the elevated drive current to prevent a drive current threshold from being exceeded when the pixel is being driven; (5) determining, for each of the plurality of pixels, an applied scalar to be applied to the elevated drive current of the pixel when the pixel is being driven, wherein for at least some of the plurality of pixels, the applied scalar for a first pixel is based at least on [a] the required scalar of a second pixel and [b] a spatial relationship between the first pixel and the second pixel; and (6) outputting corrected image data using the applied scalars to control driving of each of the plurality the pixels.

In the above example, the applied scalar for the first pixel may be less than its required scalar. A degree to which the applied scalar for the first pixel is less than its required scalar can be based at least on a distance between the first pixel and the second pixel. A degree to which the applied scalar for the first pixel is less than its required scalar can be based at least on relative levels of the required scalar for the first pixel and the required scalar for the second pixel.

In the above example, blurring can be applied to smooth transition of values among at least some of the applied scalars. The blurring is applied differently to different portions of the display. The input image data can be one of a series of frames of input image data, and the blurring can be applied differently to different frames. The blurring can further be performed based at least on a contrast sensitivity determined from candidate applied scalars.

In the above example, for a region around the first pixel, the required scalar of the second pixel can be a smallest required scalar within the region, and the region can vary in size for different portions of the display.

In the above example, the input image data can be one of a series of frames of input image data, and where the applied scalars can be based at least on changes in applied scalars from one frame of input image data to another frame of input image data.

A computing system is provided according to another example, having a display, logic machine, and storage machine that holds instructions executable by the logic machine to (1) receive input image data configured to cause display of imagery on the display with a commanded luminance at each of a plurality of pixels; (2) determine, for each of the plurality of pixels, a degradation value; (3) determine, for each of the plurality of pixels, based at least on the degradation value, an elevated drive current needed to cause the pixel to produce its commanded luminance; (4) determine, for each of the plurality of pixels, a required scalar for the elevated drive current to prevent a drive current threshold from being exceeded when the pixel is being driven; (5) determine, for each of the plurality of pixels, an applied scalar to be applied to the elevated drive current of the pixel when the pixel is being driven, wherein for at least some of the plurality of pixels, the applied scalar for a first pixel is based at least on [1] the required scalar of a second pixel and [2] a spatial relationship between the first pixel and the second pixel; and (6) output corrected image data using the applied scalars to control driving of each of the plurality the pixels.

In the above example, the applied scalar for the first pixel can be less than its required scalar, and where a degree to which the applied scalar for the first pixel is less than its required scalar can be based at least on a distance between the first pixel and the second pixel. Further a degree to which the applied scalar for the first pixel is less than its required scalar can be based at least on relative levels of the required scalar for the first pixel and the required scalar for the second pixel.

In the above example, the instructions can be further executable to apply blurring to smooth transition of values among at least some of the applied scalars, and the blurring can applied differently to different portions of the display.

In the above example, where for a region around the first pixel, the required scalar of the second pixel can be a smallest required scalar within the region, and the region can vary in size for different portions of the display.

In the above example, the input image data can be one of a series of frames of input image data, and where the applied scalars are based at least on changes in applied scalars from one frame of input image data to another frame of input image data.

A computing system is provide according to yet another example, and includes display, logic machine, and storage machine that holds instructions executable by the logic machine to: (1) receive input image data configured to cause display of imagery on the display with a commanded luminance at each of a plurality of pixels; (2) determine, for each of the plurality of pixels, a degradation value; (3) determine, for each of the plurality of pixels, based at least on the degradation value, an elevated drive current needed to cause the pixel to produce its commanded luminance; (4) determine, for each of the plurality of pixels, a required scalar for the elevated drive current to prevent a drive current threshold from being exceeded when the pixel is being driven; (5) determine, for each of the plurality of pixels, an applied scalar to be applied to the elevated drive current of the pixel when the pixel is being driven, wherein for at least some of the plurality of pixels, the applied scalar for a first pixel is based at least on [1] the required scalar of a second pixel and [2] a spatial relationship between the first pixel and the second pixel, and wherein the applied scalar for the first pixel is less than its required scalar to a degree based at least on a distance between the first pixel and the second pixel; (6) apply blurring to smooth transition of values among at least some of the applied scalars; and (7) output corrected image data using the applied scalars to control driving of each of the plurality the pixels.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for a display device, comprising:
receiving input image data configured to cause display of imagery on the display device, wherein the input image data includes a plurality of commanded luminance values corresponding to a plurality of pixels of the display device;
determining, for each of the plurality of pixels of the display device, a degradation value indicating an extent to which the pixel is deficient in its ability to provide a reference commanded luminance value relative to that of a non-degraded pixel of the display device;
determining, for each of the plurality of pixels of the display device, based at least on the degradation value corresponding to the pixel, an elevated drive current needed to cause the pixel to produce its commanded luminance value;
determining, for each of the plurality of pixels of the display device, a required scalar for the elevated drive current to prevent a drive current threshold from being exceeded when the pixel is being driven;
determining, for each of the plurality of pixels of the display device, an applied scalar to be applied to the elevated drive current of the pixel when the pixel is being driven, wherein for at least some of the plurality of pixels, the applied scalar for a first pixel is based at least on [1] the required scalar of a second pixel and [2] a spatial relationship between the first pixel and the second pixel; and
outputting corrected image data using the applied scalars to control driving of each of the plurality the pixels of the display device to cause display of the imagery on the display device.

2. The method of claim 1, where the applied scalar for the first pixel is less than its required scalar.

3. The method of claim 2, where a degree to which the applied scalar for the first pixel is less than its required scalar is based at least on a distance between the first pixel and the second pixel.

4. The method of claim 2, where a degree to which the applied scalar for the first pixel is less than its required scalar is based at least on relative levels of the required scalar for the first pixel and the required scalar for the second pixel.

5. The method of claim 1, further comprising applying blurring to smooth transition of values among at least some of the applied scalars.

6. The method of claim 5, where the blurring is applied differently to different scalars corresponding to different portions of the display device.

7. The method of claim 5, where the input image data is one of a series of frames of input image data, and where the blurring is applied differently to different frames.

8. The method of claim 5, where the blurring is performed based at least on a contrast sensitivity determined from candidate applied scalars.

9. The method of claim 1, where for a region around the first pixel, the required scalar of the second pixel is a smallest required scalar within the region.

10. The method of claim 9, where the region varies in size for different portions of the display device.

11. The method of claim 1, where the input image data is one of a series of frames of input image data, and where the applied scalars are based at least on changes in applied scalars from one frame of input image data to another frame of input image data.

12. A computing system, comprising:
a display device;
a logic machine; and
a storage machine holding instructions executable by the logic machine to:
receive input image data configured to cause display of imagery on the display device, wherein the input image data includes a plurality of commanded luminance values corresponding to a plurality of pixels of the display device;
determine, for each of the plurality of pixels of the display device, a degradation value indicating an extent to which the pixel is deficient in its ability to provide a reference luminance value relative to that of a non-degraded pixel of the display device;
determine, for each of the plurality of pixels of the display device, based at least on the degradation value corresponding to the pixel, an elevated drive current needed to cause the pixel to produce its commanded luminance value;
determine, for each of the plurality of pixels of the display device, a required scalar for the elevated drive current to prevent a drive current threshold from being exceeded when the pixel is being driven;
determine, for each of the plurality of pixels of the display device, an applied scalar to be applied to the elevated drive current of the pixel when the pixel is being driven, wherein for at least some of the plurality of pixels, the applied scalar for a first pixel is based at least on [1] the required scalar of a second pixel and [2] a spatial relationship between the first pixel and the second pixel; and
output corrected image data using the applied scalars to control driving of each of the plurality the pixels of the display device to cause display of the imagery on the display device.

13. The computing system of claim 12, where the applied scalar for the first pixel is less than its required scalar, and where a degree to which the applied scalar for the first pixel is less than its required scalar is based at least on a distance between the first pixel and the second pixel.

14. The computing system of claim 12, where the applied scalar for the first pixel is less than its required scalar, and where a degree to which the applied scalar for the first pixel is less than its required scalar is based at least on relative levels of the required scalar for the first pixel and the required scalar for the second pixel.

15. The computing system of claim 12, where the instructions are further executable to apply blurring to smooth transition of values among at least some of the applied scalars.

16. The computing system of claim 15, where the blurring is applied differently to different scalars corresponding to different portions of the display device.

17. The computing system of claim 12, where for a region around the first pixel, the required scalar of the second pixel is a smallest required scalar within the region.

18. The computing system of claim 17, where the region varies in size for different portions of the display device.

19. The computing system of claim 12, where the input image data is one of a series of frames of input image data, and where the applied scalars are based at least on changes in applied scalars from one frame of input image data to another frame of input image data.

20. A computing system, comprising:
- a display device;
- a logic machine; and
- a storage machine holding instructions executable by the logic machine to:
  - receive input image data configured to cause display of imagery on the display device, wherein the input image data includes a plurality of commanded luminance values corresponding to a plurality of pixels of the display device;
  - determine, for each of the plurality of pixels of the display device, a degradation value indicating an extent to which the pixel is deficient in its ability to provide a reference commanded luminance value relative to that of a non-degraded pixel of the display device;
  - determine, for each of the plurality of pixels of the display device, based at least on the degradation value corresponding to the pixel, an elevated drive current needed to cause the pixel to produce its commanded luminance value;
  - determine, for each of the plurality of pixels of the display device, a required scalar for the elevated drive current to prevent a drive current threshold from being exceeded when the pixel is being driven;
  - determine, for each of the plurality of pixels of the display device, an applied scalar to be applied to the elevated drive current of the pixel when the pixel is being driven, wherein for at least some of the plurality of pixels, the applied scalar for a first pixel is based at least on [1] the required scalar of a second pixel and [2] a spatial relationship between the first pixel and the second pixel, and wherein the applied scalar for the first pixel is less than its required scalar to a degree based at least on a distance between the first pixel and the second pixel;
  - apply blurring to smooth transition of values among at least some of the applied scalars; and
  - output corrected image data using the applied scalars to control driving of each of the plurality the pixels of the display device to cause display of the imagery on the display device.

* * * * *